United States Patent
Guo et al.

(10) Patent No.: US 11,197,209 B2
(45) Date of Patent: Dec. 7, 2021

(54) EFFICIENT COMPUTING OF APPLICATION DATA IN MOBILE COMMUNICATION NETWORK

(71) Applicant: NOKIA SOLUTIONS AND NETWORKS OY, Espoo (FI)

(72) Inventors: Guanhua Guo, Shandong (CN); Yigang Cai, Naperville, IL (US); Zhi Wang, Qingdao (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/862,032

(22) Filed: Apr. 29, 2020

(65) Prior Publication Data
US 2020/0351724 A1 Nov. 5, 2020

(30) Foreign Application Priority Data
May 3, 2019 (FI) ...................................... 20195364

(51) Int. Cl.
*H04L 12/00* (2006.01)
*H04W 36/00* (2009.01)

(52) U.S. Cl.
CPC .............................. *H04W 36/0055* (2013.01)

(58) Field of Classification Search
None
See application file for complete search history.

(56) References Cited

U.S. PATENT DOCUMENTS

| 2017/0272365 | A1  | 9/2017  | Wei et al. |
| 2018/0192390 | A1  | 7/2018  | Li et al. |
| 2019/0045000 | A1* | 2/2019  | Hiremath .............. H04L 49/501 |
| 2019/0068520 | A1  | 2/2019  | Kim |
| 2020/0125389 | A1* | 4/2020  | Palermo ................ G06F 9/5027 |
| 2020/0196203 | A1* | 6/2020  | Yang ..................... H04W 36/14 |
| 2020/0235952 | A1* | 7/2020  | Mukherjee ............. H04W 8/22 |
| 2020/0329008 | A1* | 10/2020 | Dao .................... H04L 61/2007 |

OTHER PUBLICATIONS

Finnish Search Report dated Nov. 7, 2019 corresponding to Finnish Patent Application No. 20195364.
(Continued)

*Primary Examiner* — Noel R Beharry
*Assistant Examiner* — Lionel Preval
(74) *Attorney, Agent, or Firm* — Squire Patton Boggs (US) LLP (57) ABSTRACT

There is provided a solution for balancing application content processing in a mobile communication network. According to an aspect, a method comprises: determining to handover content processing of application data of a terminal device from a first network element to a second network element, wherein one of the first network element and the second network element is configured to perform multi-access edge computing and the other one of the first network element and the second network element is an application server in a core network or beyond the core network from a perspective of the multi-access edge computing; and transmitting at least one handover message to handover the content processing of the application data from the first network element to the second network element.

16 Claims, 5 Drawing Sheets

(56) References Cited

OTHER PUBLICATIONS

Office Action dated Nov. 7, 2019 corresponding to Finnish Patent Application No. 20195364.
Communication of Acceptance under section 29a of Patents Decree dated Mar. 25, 2020.
ETSI GS MEC 002 V2.1.1 (Oct. 2018); Multi-access Edge Computing (MEC); Phase 2: Use Cases and Requirements. [online] Oct. 25, 2018.
C. Cicconetti et al., "Low-latency Distributed Computation Offloading for Pervasive Environments." 2019 IEEE International Conference on Pervasive Computing and Communications (PerCom) [online] Mar. 11, 2019.
Sep. 8, 2020 Extended Search Report issued in European Patent Application No. 20171954.9.
"3rd Generation Partnership Project; Technical Specification Group Services and System Aspects; Study on architecture enhancements for EPS and 5G System to support advanced V2X services (Release 16)" 3GPP Standard; Technical Report; 3GPP TR 23.786, 3rd Generation Partnership Project (3GPP), Mobile Competence Centre; 650, Route Des Lucioles; F-06921 Sophia-Antipolis Cedex; France, vol. SA WG2, No. V0.7.0, Jul. 10, 2018, pp. 1-57.

\* cited by examiner

EFFICIENT COMPUTING OF APPLICATION DATA IN MOBILE COMMUNICATION NETWORK

TECHNICAL FIELD

The invention relates to a mobile communication network provided with capability of processing application data.

BACKGROUND

Multi-access edge computing (MEC) is a technology in modern mobile communication networks, such as 4th and 5th generation cellular networks, which enables provision of cloud computing and information technology services within the proximity of mobile subscribers. Located in or close to the network edge, the MEC can offer services with low latency. MEC is capable of reducing traffic to a core network. The MEC has been identified as a building block in 5G architecture because it can satisfy the demanding throughput, latency, scalability and automation requirements expected for the 5G era.

US 2017/272365 discloses a method for managing a network traffic of a radio access network, the method comprising steps of identifying, by a processor of a baseband unit (BBU), at least one characteristic of a data traffic received from at least one user equipment, and determining, by the processor, whether to process locally at an edge node or at a remote service network in response to the at least one characteristic of the data traffic received from the user equipment.

BRIEF DESCRIPTION

According to an aspect, there is provided the subject matter of the independent claims. Some embodiments are defined in the dependent claims.

According to an aspect, there is provided an apparatus comprising means for performing: determining to handover content processing of application data of a terminal device from a first network element to a second network element, wherein one of the first network element and the second network element is configured to perform multi-access edge computing and the other one of the first network element and the second network element is an application server in a core network or beyond the core network from a perspective of the multi-access edge computing; and transmitting at least one handover message to handover the content processing of the application data from the first network element to the second network element.

In an embodiment, the content processing of the application data comprising application layer analysis of the application data or application layer transformation of the application data.

In an embodiment, the means are configured to determine the handover on the basis of at least one of the following handover criteria: processing load in the multi-access edge computing, latency requirement of the application data, location or mobility of the terminal device, and preference of the terminal device, and preference of the application server.

In an embodiment using the preference(s) of the terminal device for making the handover decision, another aspect is provided where an apparatus for the terminal device comprises: means for processing the application data; means for transmitting and/or receiving the application data through one or more access nodes of the mobile communication network; and means for transmitting a message comprising at least one information element indicating a preference of the apparatus for a location for processing the application data, wherein the indicated location refers to the multi-access edge computing or to the application server in the core network of beyond the core network. The preference may be indicated in terms of explicitly indicating the location or implicitly indicating the location.

In an embodiment, the at least one handover message comprises a handover message directed to the application server and a handover command directed to a session management function controlling user plane traffic routing of the terminal device.

In an embodiment, the handover message directed to the application server comprises an application identifier of an application associated with the application data and an identifier indicating the terminal device.

In an embodiment, the means are configured to receive, in response to the handover message directed to the application server, a traffic steering configuration, and to transmit the traffic steering configuration to the session management function in the handover command.

In an embodiment, the at least one handover message further comprises a handover message directed to the network element of the multi-access edge computing, and wherein the means are configured to receive, in response to the handover message directed to the network element of the multi-access edge computing, application context information, and to transmit the application context information to the session management function in the handover command.

In an embodiment, the means are configured to implement a policy control function in a mobile communication network comprising the terminal device, the first network element, and the second network element, and wherein the means are configured to transmit the handover command to a network exposure function of the mobile communication network.

In an embodiment, the means are configured to implement a network exposure function of a mobile communication network and to provide an application programming interface between a policy control function of the mobile communication network and each of the first network element and the second network element, to perform said determining on the basis of a handover message received from the policy control function.

In an embodiment, the means are configured to transmit a processing load query request to the network element of the multi-access edge computing and to receive, in response to the processing load request, a processing load response from the network element of the multi-access edge computing, the processing load response indicating processing load of the network element of the multi-access edge computing.

In an embodiment, the means comprises at least one processor and at least one memory including a computer program code, wherein the at least one memory and the computer program code are configured, with the at least one processor, to cause the performance of the apparatus.

According to another aspect, there is provided a method comprising: determining, by a network element of a mobile communication network, to handover content processing of application data of a terminal device from a first network element to a second network element, wherein one of the first network element and the second network element is configured to perform multi-access edge computing and the other one of the first network element and the second network element is an application server in a core network or beyond the core network from a perspective of the multi-access edge computing; and transmitting, by the network element, at least one handover message to handover the content processing of the application data from the first network element to the second network element.

In an embodiment, the method is carried out by a policy control function of the mobile communication network, and wherein the handover message is transmitted to a network exposure function of the mobile communication network.

In an embodiment, the method is carried out by a network exposure function of the mobile communication network, the network exposure function providing an application programming interface between a policy control function of the mobile communication network and each of the first network element and the second network element, and wherein the network exposure function performs said determining on the basis of a handover message received from the policy control function.

According to another aspect, there is provided a computer program product embodied on a computer-readable medium and comprising a computer program code readable by a computer, wherein the computer program code configures the computer to carry out a computer process comprising: determining to handover content processing of application data of a terminal device from a first network element to a second network element, wherein one of the first network element and the second network element is configured to perform multi-access edge computing and the other one of the first network element and the second network element is an application server in a core network or beyond the core network from a perspective of the multi-access edge computing; and transmitting at least one handover message to handover the content processing of the application data from the first network element to the second network element.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
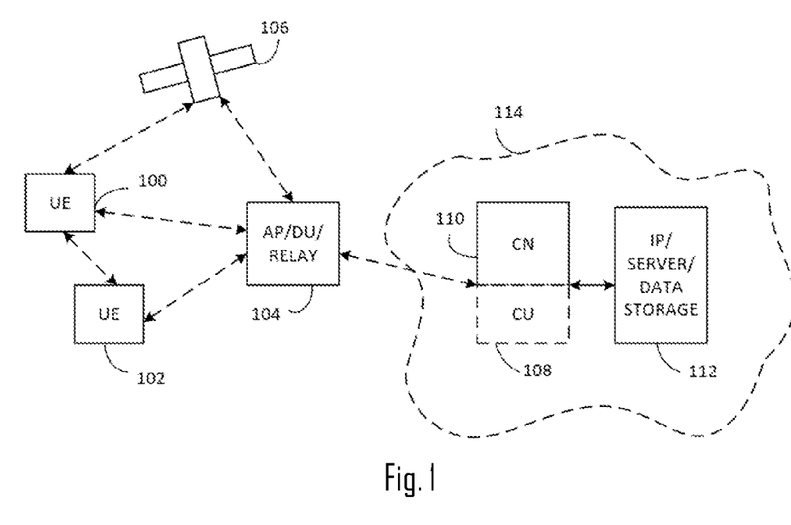
FIG. 1 illustrates an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104 (such as (e/g)NodeB) providing the cell. The physical link from a user device to a (e/g)NodeB is called uplink (UL) or reverse link and the physical link from the (e/g)NodeB to the user device is called downlink or forward link. It should be appreciated that (e/g)NodeBs or their functionalities may be implemented by using any node, host, server or access point etc. entity suitable for such a usage. Said node 104 may be referred to as network node 104 or network element 104 in a broader sense.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a user plane function (UPF) (this may be 5G gateway corresponding to serving gateway (S-GW) of 4G) or access and mobility function (AMF) (this may correspond to mobile management entity (MME) of 4G).

The user device 100, 102 (also called UE, user equipment, user terminal, terminal device, mobile terminal, etc.) illustrates one type of an apparatus to which resources on the air interface are allocated and assigned, and thus any feature described herein with a user device may be implemented with a corresponding apparatus, such as a part of a relay node. An example of such a relay node is an integrated access and backhaul (IAB)-node (a.k.a. self-backhauling relay).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink-only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments mobile terminal (MT) part of the relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices may have one or more antennas. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. MEC covers a wide range of technologies such as wireless sensor networks, mobile data acquisition, mobile signature analysis, cooperative distributed peer-to-peer ad hoc networking and processing, autonomous vehicles, traffic safety, real-time analytics, time-critical control, and healthcare applications. A basic concept of the MEC is that application level cloud-computing capabilities, information technology services, etc. are provided at the edge of the mobile communication network. The edge refers to the radio access network and/or other network elements closer to the terminal devices than a core network 110 or the application servers 112 in FIG. 1. The MEC is characterized by ultra-low latency and high bandwidth as well as real-time access to radio network information that can be leveraged by applications. According to the MEC concept, a mobile network operator may open the radio access network edge to authorized third-parties, allowing them to flexibly and rapidly deploy innovative applications and services towards mobile subscribers, enterprises and vertical segments. Applications that may benefit of the MEC include video analytics, location-based services, Internet-of-Things (IoT), augmented reality, local content distribution, data caching, and automotive applications. The MEC allows software applications to access local content and real-time information about local access network conditions. The MEC may also reduce the traffic between the radio access network and the core network by performing the high-level application processing close to the terminal devices.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side and non-real time functions being carried out in a centralized manner.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
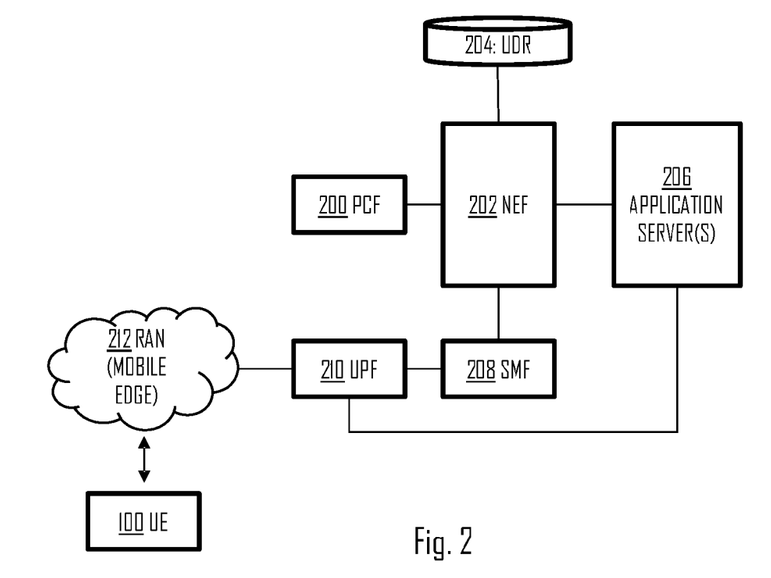
FIG. 2 illustrates elements of a mobile communication network to which embodiments of the invention may be applied.

FIG. 2 illustrates a block diagram of some network elements and their interconnections in a 5G mobile communication network. Referring to FIG. 2, the terminal device 100 (UE) is connected to a radio access network 212 illustrated by the cloud in FIG. 2. The radio access network may comprise or be comprised in the multi-access edge or mobile edge of the mobile communication network that performs the multi-access edge computing. The multi-access edge may comprise one or a plurality of the following network elements: various access nodes of the radio access network 212 including fixed and mobile base stations, radio network controllers of the 5G system for interconnection with other radio access technologies such as WiFi (IEEE 802.11 networks), cable modem termination systems (CMTS), terminals of optical networks, access points for other wireless networks such as Zigbee, WiFi, or MuLTE-fire, routers, and switches. Virtually any network element in the radio access network or closer to the terminal device than the core network 110 and having application data processing capability may be harnessed for the multi-access edge computing.

The radio access network is connected to a user plane function (UPF) 210 that serves as an anchor point for protocol data unit (PDU) sessions established with the terminal devices. The UPF provides data packet routing and quality-of-service (QoS) management functions, for instance. The UPF is controlled by a session management function (SMF) 208 that provides traffic steering configurations for the UPF 210 for proper traffic routing. The SMF also performs session management including session establishment, modification, and release, UE internet protocol (IP) address allocation & management and other Dynamic Host Configuration Protocol (DHCP) functions, terminate non-access stratum (NAS) signaling that is related to session management, etc.

A policy control function (PCF) 200 is responsible for a unified policy framework that governs behavior of the mobile communication network. The PCF provides policy rules to user plane and control plane functions. The PCF may access a unified data repository 204 (UDR) when creating or modifying policies. The UDR 204 stores, for example subscriber information related to the terminal devices, and it may define some preferences of the subscription that may affect the policies decided by the PCF. A network exposure function (NEF) 202 provides an adaptation or exposure function that enables secure exposure of services and features between the 5G core network elements (e.g. the PCF) and application server(s) 206. The NEF 202 may mediate information on capabilities and events between the core network elements and the application servers, provide a translation function for the information in to form of an application programming interface (API). The NEF 202 may be described as service-aware border gateway that enables application servers or functions external to the 5G core network to communicate with the network elements of the core network.

A user plane connection may also be provided between the UPF 210 and the application server(s) 206 for the purpose of transfer of application data.

The MEC can provide the core network with application content processing functions to offload the processing burden and to bring the application level processing closer to the terminal devices. The MEC may thus be used to provide low-latency, high-performance services. However, MEC is also an expensive solution with limited processing resources. If the low latency is not critical, it would be more efficient to route the application data to the core network or beyond for processing. Because of the high performance of the MEC, it would be beneficial to keep the MEC processing power fully utilized. However, overloaded MEC would degrade the performance of the MEC.

Figure 3:
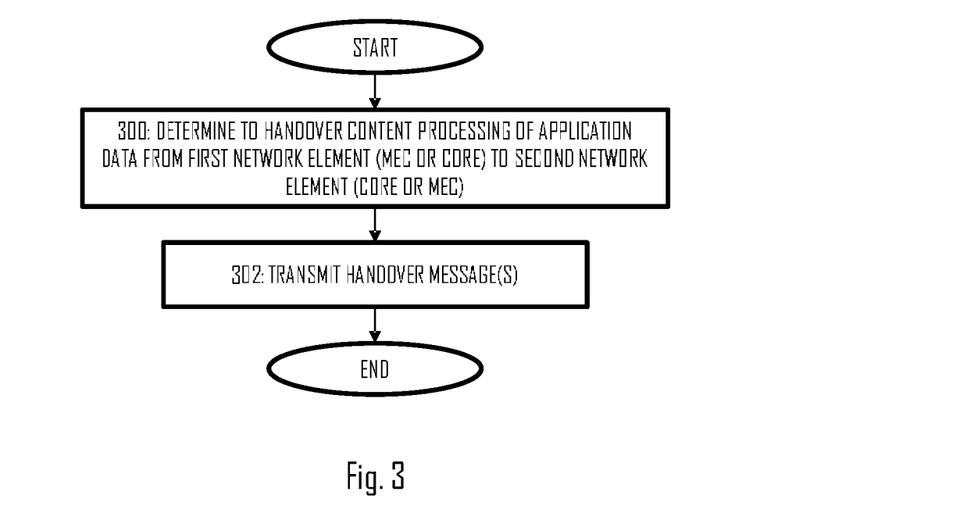
FIG. 3 illustrates an embodiment for making a handover decision for a session suitable for both multi-access edge computing and cloud core computing.

FIG. 3 illustrates an embodiment of a process for controlling the application data content processing in the mobile communication network. Referring to FIG. 3, the process comprises as performed by an apparatus of the mobile communication network: determining (block 300) to handover content processing of application data of a terminal device from a first network element to a second network element, wherein one of the first network element and the second network element is configured to perform multi-access edge computing and the other one of the first network element and the second network element is an application server in a core network or beyond the core network from a perspective of the multi-access edge computing; and transmitting (block 302) at least one handover message to handover the content processing of the application data from the first network element to the second network element.

The embodiment of FIG. 3 thus provides a mechanism to dynamically divide and steer application layer processing tasks between the MEC and the application server according to certain policies. This is implemented through a handover procedure in which an application content processing task is handed from the first network element to the second network element. The handover may be performed during a session of a terminal device executing an application associated with the application data.

In an embodiment, the content processing of the application data refers to application layer analysis of the application data or application layer transformation of the application data. The analysis may include analyzing sensor data and outputting a notification or a command on the basis of the analysis. The transformation may be understood to comprise transforming the contents of the application data, which distinguishes the content processing from mere decoding and re-encoding and data forwarding or routing type of processing. The content processing may exclude also lossy or lossless data compression functions that are not primary functions of the application utilizing the application data.

Figure 4:
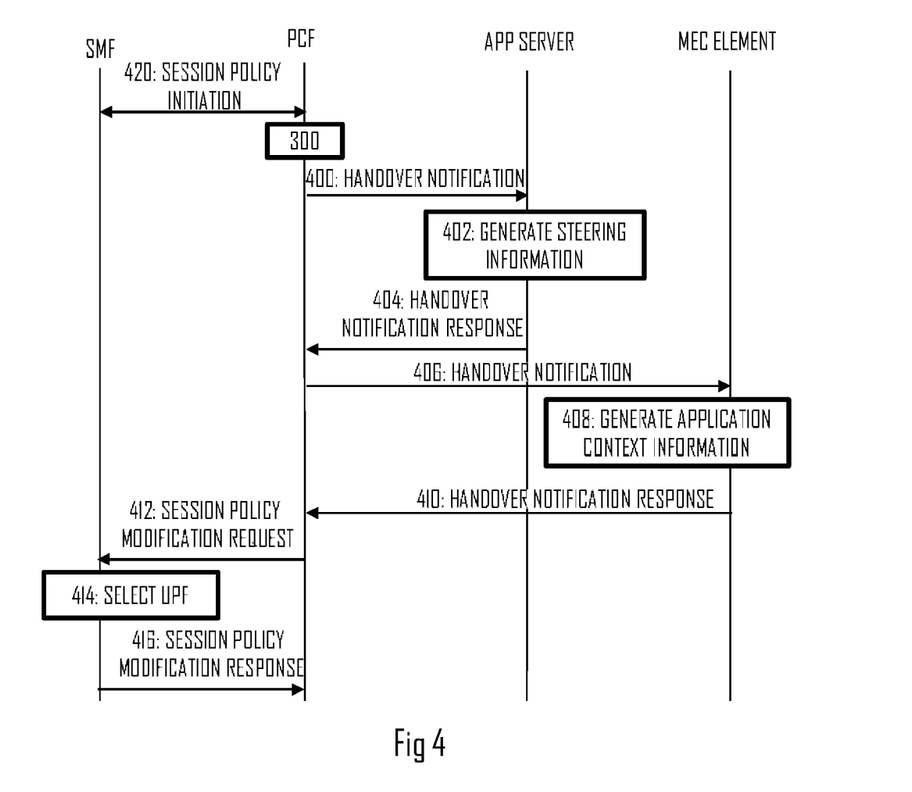
FIG. 4 illustrates an embodiment of a handover procedure for a session being handed over between multi-access edge computing and an application server in a core network or a data network beyond the core network.

In an embodiment, the apparatus performing the process of FIG. 3 is the PCF 200. The PCF may make the decision of the handover and transmit the handover message. FIG. 4 illustrates an embodiment of such a handover procedure during a session. Referring to FIG. 4, the SMF and the PCF negotiate an initial policy for the content processing of the application data of an application (step 420). The initial policy may be that the MEC performs the content processing or that the application server performs the content processing of the application data. Step 420 may comprises the SMF transmitting, when establishing a session for the application in the mobile communication network, a policy creation request to the PCF via an interface between the SMF and the PCF. The interface may be or comprise Npcf interface, and the message may be denoted by Npcf_SMPolicyControl_ Create. Upon receiving the policy creation request, the PCF may make a decision about the policy for the session, e.g. that the MEC shall perform the content processing of the application data for the session. Upon making the decision, the PCF may respond to the policy creation request by transmitting a policy creation response to the SMF via the interface. The policy creation response message may be denoted by Npcf_SMPolicyControl_Create response. Thereafter, the SMF may control the UPF to establish necessary PDU sessions for the application, as defined in specifications of the mobile communication network, e.g. the 5G network.

Upon determining to change the content processing policy for the session or the application in block 300, e.g. upon making a policy change decision, the PCF may transmit a handover notification message to the application server in step 400. The handover notification message is an embodiment of the handover message described in connection with block 302. The handover notification message comprises an indication indicating handover of the content processing between the MEC and the application server. Let us now for the sake of clarity focus on handing the content processing from the MEC over to the application server. In such an embodiment, the handover notification may include at least an identifier of the application and an identifier of the terminal device. The identifier of the terminal device may be a Generic Public Subscription Identifier (GPSI), an IP address assigned to the terminal device, or another identifier. Additionally, the handover notification may comprise a transaction identifier identifying the handover notification and enabling mapping of the handover notification and associated response from the application server.

Upon receiving the handover notification message from the PCF in step 400, the application server may generate steering configuration (block 402) that enables routing of the application data to appropriate one or more server computers that are assigned with the task of the content processing for the terminal device. This may include selecting one or more physical or virtual server computers. The selection may be based on the identifier of the terminal device and QoS requirements of the application, for example. The steering configuration may include one or more of the following information: Adaptation Function (AF) Service Identifier identifying a target data network name (DNN) to which the content processing shall be handed over, a data network access identifier (DNAI), N6 interface steering, and location(s) of one or more physical or virtual application server computers configured to execute content processing of an application associated with the session. N6 interface is an interface between the UPF and the external data networks. In particular, the steering configuration comprises sufficient information enabling routing of data packets of the application to an appropriate application server. Such steering configuration is transmitted by the application server to the PCF in a handover notification response message in step 404.

Upon receiving the handover notification response from the application server in step 404, the PCF may send a handover notification message to the MEC network element (step 406). The handover notification message transmitted in step 406 may comprise the same above-described information as the handover notification message of step 400, enabling the MEC network element to identify the session that is to be handed over. Upon receiving the handover notification message in step 406, the MEC network element may generate (block 408) context information of the application or the session. The context information may comprise a user identifier, application session information, and/or other information needed by the application server to generate or duplicate the session. The context information may be application layer information transparent to the PCF, and it enables service continuity during and after the handover. The MEC network element may transmit the context information to the PCF in a handover notification response message in step 408. The handover notification responses of steps 404 and 408 may comprise the same transaction identifier as in the respective handover notification messages of steps 400 and 406.

In an embodiment, the handover notification messages 400 and 406 may be transmitted in a different order or even simultaneously. The PCF uses the handover notification messages to gather sufficient information to enable the execution of the handover. Upon gathering the information from the handover notification response messages, the PCF may provide the SMF with the steering and context information to enable the SMF to execute the handover. The information may be provided in a session policy modification request transmitted by the PCF to the SMF in step 412. The session policy modification request may be a handover command commanding the SMF to hand over the session from the MEC network element to the application server. Upon receiving the session policy medication request from the PCF in step 412, the SMF may select a new UPF for the session on the basis of the steering configuration, transmit the traffic steering configuration and application context information to the new UPF, and notify the old UPF of the handover. The notification may include an identifier of the new UPF. The new UPF may then steer traffic of this session and the application context information to the application server identified by the steering configuration. The old UPF may, upon receiving the notification from the SMF, forward any remaining traffic of this session to the new UPF. The handover may be transparent to the terminal device, and the terminal device may transmit the application data to the old UPF even after the handover, and the old UPF relays the application data to the new UPF.

The handover procedure may be substantially similar when handing the content processing from the application server over to the MEC network element. The only substantial difference would be that the MEC network element would generate the steering configuration, and the application server would generate the application context information. Certain modifications to the procedure of FIG. 4 may, however, be made depending on the embodiment. For example, block 300 may comprise determining that processing capacity exists in the MEC and that some content processing is possible to hand over from the application server(s) to the MEC. So block 300 may be carried out without pinpointing any specific session or application. In such a case, the handover notification message of step 400 may be void of the application identifier or the terminal device identifier. Upon receiving the handover notification message, the application server may select one or more sessions to be handed over and transmit the above-described application identifier and the terminal device identifier to the PCF in the handover notification response in step 404. The handover notification response may in such a case comprise the application context information as well. Upon receiving the handover notification response from the application server, the PCF may provide the received identifiers and the context information to the SMF in step 412, and the handover execution procedure may be carried out in the above-described manner. In this embodiment, steps 406 to 410 may be omitted because there is no information to be gathered from the MEC network element.

It should be appreciated that the application server in FIG. 4 may be the same application server to which the content processing is handed over, or it may be a different application server. For example, one application server entity may carry out the handover procedure and another application server entity may carry out the content processing.

As described above, the NEF 202 may serve as an adaptation function between the network elements of the core network (e.g. the PCF) and the application servers. As a consequence, the handover notification message of step 400 and associated response of step 404 may be communicated through the NEF, and the NEF may perform format modification and/or other adaptation to the messages. The NEF may thus provide an API between the PCF and the application server(s) for the purposes of the handovers between the MEC and the application server(s). The NEF may comprise a secured access layer to provide secured communication to and from the core network of the mobile communication network.

In addition to mediating the handover messages, the NEF may deliver messages between the MEC and the application server(s). For example, a MEC service may have a charging rate plan. The charging rate may define a cost for utilizing the MEC computation. The NEF may deliver the charging rate plan, a current charging rate, or other corresponding information to the application server based on their request or autonomously. The application server may take the charging rate into the consideration when responding to the offer to hand over content processing from the application server to the MEC. Another function of the NEF may be to mediate preferences of the application server regarding the content processing to the PCF, e.g. preferences based on the charging rate. The application server may request for specific traffic to be steered or handed over to the application server instead of the MEC, or vice versa. Table 1 below lists a couple of simple examples of such preferences for the MEC content processing policy:

TABLE 1

| Index | Criteria | Action |
| --- | --- | --- |
| 1 | Traffic ID #1 | Steer to application server |
| 2 | Traffic ID #2 and MEC idle | Steer to MEC |

MEC Traffic Policy 1 (Index 1) means the content processing will shall always be steered to the application server, e.g. because it may be latency-tolerant or have a low priority from the view of the application. MEC Traffic Policy 2 (Index) means the content processing shall be steered to MEC only when the MEC is idle or has at least a determined amount of idle processing capacity. Otherwise, the content processing shall be steered to the application server. The application may assign this policy to low priority application data even when the application data has a low latency demand. Other preferences may be generated in a straightforward manner, e.g. combined with any conceivable attributes such as:

Traffic identifier: application data associated with a determined traffic indicator such as a determined source and/or destination address. For example, content processing of a certain source device shall be carried out in the MEC (or the application server)

Time window: at a certain time interval, the content processing shall be steered to the application server, e.g. office hours UE location: content processing of a terminal device in a determined area shall be carried out in the MEC (or the application server)

User profile: application data associated with a determined user or subscription profile shall be carried out in the MEC (or the application server)

Data throughout: application data having a determined throughput shall be carried out in the MEC (or the application server)

Latency: if the application data has a high latency or low latency tolerance, the content processing shall be steered to the MEC;

Charging rate: if the charging rate of MEC content processing is above a threshold, the content processing shall be steered to the application server Media type: if the application data is of a certain media type, e.g. video data or motion sensor data, the content processing shall be carried out in the MEC (or the application server)

The application server may query information related to setting the preferences from the PCF via the NEF and, based on the queried information, set the preferences. For example, an application may have a total charging budget for MEC at 500$. The application may query the MEC charging plan via the NEF, and each MEC session will be charged 5$. Based on the information, the application may create a preference and send it to the PCF, the preference defining that if the total MEC charging does not exceed the budget, the session preference is to direct the content processing to the MEC. The application may provide a prioritized list of sessions, and the PCF may decide which session will have its contents processed by the MEC and which session by the application server, if the total charging is exceeded.

Figure 5:
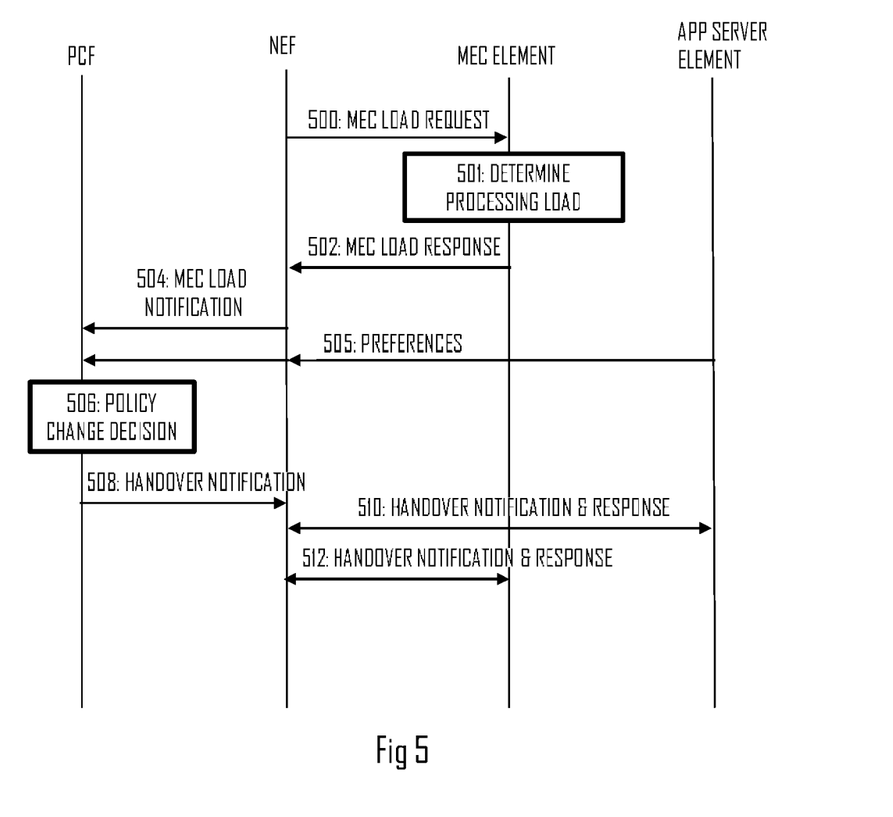
FIG. 5 illustrates a signaling diagram of a procedure employing a network exposure function as an interface between a policy control function and application server(s)

The NEF may also acquire information relevant to the handover decision in block 300. FIG. 5 illustrates an embodiment of a procedure for acquiring the information for the handover decision. Referring to FIG. 5, the NEF may query a current processing load of the MEC and transmit a MEC load request message to the MEC element in step 500. The MEC element such as a MEC controller may determine the current processing load in the MEC in block 501 and respond to the MEC load request with a MEC load response in step 502, the MEC load response comprising at least one information element indicating the current processing load in the MEC. The processing load may be indicated in the form of content capacity remaining in the MEC, percentage of processing capacity of the MEC currently in use, or in any alternative manner. Table 2 below illustrates an embodiment of some of the contents of the MEC load response:

TABLE 2

| Attribute | Description |
|---|---|
| Transaction identifier | Maps MEC load request and associated response |
| Application identifier #1 | Identifies application having contents processed by MEC |
| Load Information | Current load cause by content processing of the application #1 |
| Application identifier #N | . . . |

The NEF may, upon receiving the MEC load response in step 502, forward the MEC load information to the PCF in step 504. In step 505, the application server may provide the PCF with the above-described preferences through the NEF. In another embodiment, the application executed in the terminal device may provide at least some preferences to the PCF.

Upon determining to change the policy regarding the content processing of one or more sessions (block 506), the PCF may transmit the handover notification to the NEF (step 508). The handover notification may trigger the NEF to transmit the above-described handover notification to the application server (step 510) and, optionally, to the MEC element (step 512). Step 510 may comprise the above-described steps 400 to 404, and step 512 may comprise the above-described steps 406 to 410.

In an embodiment, the process of FIG. 3 is executed by the NEF. Upon receiving the handover notification, the NEF may perform block 300 and determine the handover. In response to the determining, the NEF may transmit the handover notification(s) of step 510 (and step 512) and the handover command in step 412.

In an embodiment, the PCF makes the decision of the handover on the basis of at least one of the following handover criteria: processing load in the MEC, latency requirement of the application data, location or mobility of the terminal device, preference of the terminal device, and preference of the application server. Let us now describe some embodiments of the policies employed by the PCF.

One policy may be based on QoS parameters of each session. QoS parameters define the latency, downlink/uplink throughput requirements of the session, etc. The PCF may define the handover policy according to the QoS requirements. For example, if a session requires latency below a determined threshold X, content processing of the session shall be steered to the MEC. Otherwise, the content processing shall be steered to the application server. If the latency requirement changes during the session, the PCF will update the policy and determine whether or not there is a need for the handover in view of the updated policy. The PCF may dynamically adjust the threshold X according to the MEC load and traffic QoS parameters, for example. If the MEC is underloaded for a certain time period, the threshold X may be raised to allow more content processing to be steered to the MEC and, thus, improve service quality, reduce traffic in the core network, and fully utilize the MEC resources.

Another policy may be based on the location and mobility of the terminal device. When making a policy regarding the content processing, the PCF may check the location and mobility of the terminal device. If the information is not available locally, the PCF may acquire the information from the UDR through the NEF. If the PCF determines that the location indicates that the terminal device is not under MEC coverage that the terminal device is moving out of the MEC coverage, the PCF may decide that the content processing shall be steered to the application server. This decision may overrule other criteria, e.g. latency requirement or preferences, because the MEC is not possible for the terminal device. If the terminal device is under the MEC coverage or is moving to the MEC coverage, the decision may be based on the other criteria, if such has been defined. If the terminal device moves from a coverage area of one MEC to a coverage area of another MEC, the policy criteria may remain or be adjusted to meet conditions and requirements of the other MEC. Each MEC may have a different platform and application-specific characteristics, and different traffic and resource limitations. In connection with determining a handover of a session from one MEC to another, the PCF may reconsider the handover between the MEC and the application server as well, if the new MEC has different characteristics.

Yet another policy may be based on MEC processing load. The PCF may acquire the MEC processing load information via the NEF, as described above. When making the decision regarding the content processing, the PCF may consider the MEC processing load. If the MEC is underloaded, the PCF may decide to steer the content processing of the session to the MEC. If the MEC is overloaded or has no remaining capacity for further processing load, the PCF may decide to steer content processing from the MEC to the application server. Latency requirement of the session may be used as a further criterion. For example, let us take the above-described latency requirement of the session and assume that the latency requirement of the session is slightly over the threshold X but below another threshold Y. Furthermore, let us assume that the MEC is underloaded. In such a case, the PCF may steer the session from the application server to the MEC in order to employ the MEC efficiently. If the latency requirement is loose, e.g. above the threshold Y, the session may be steered to the application server to save MEC resources for following sessions. If the MEC is overloaded, the PCF may search current sessions for one with largest latency requirements, if any, and to hand over such session(s) to the application server in order to make room for a new session with strict latency requirement or to avoid degradation of the QoS of sessions in the MEC.

The MEC processing load may be determined in terms of a maximum number of sessions or connections the MEC can serve concurrently. When the number of concurrent sessions in the MEC exceeds a determined threshold, the PCF may trigger the handover of one or more sessions to the application server.

Preferences of the application, terminal device, and/or the application server may be another criterion for the handover decision. The preferences may have a lower priority in the decision-making than the latency requirement, mobility, charging rate, etc.

Figure 6:
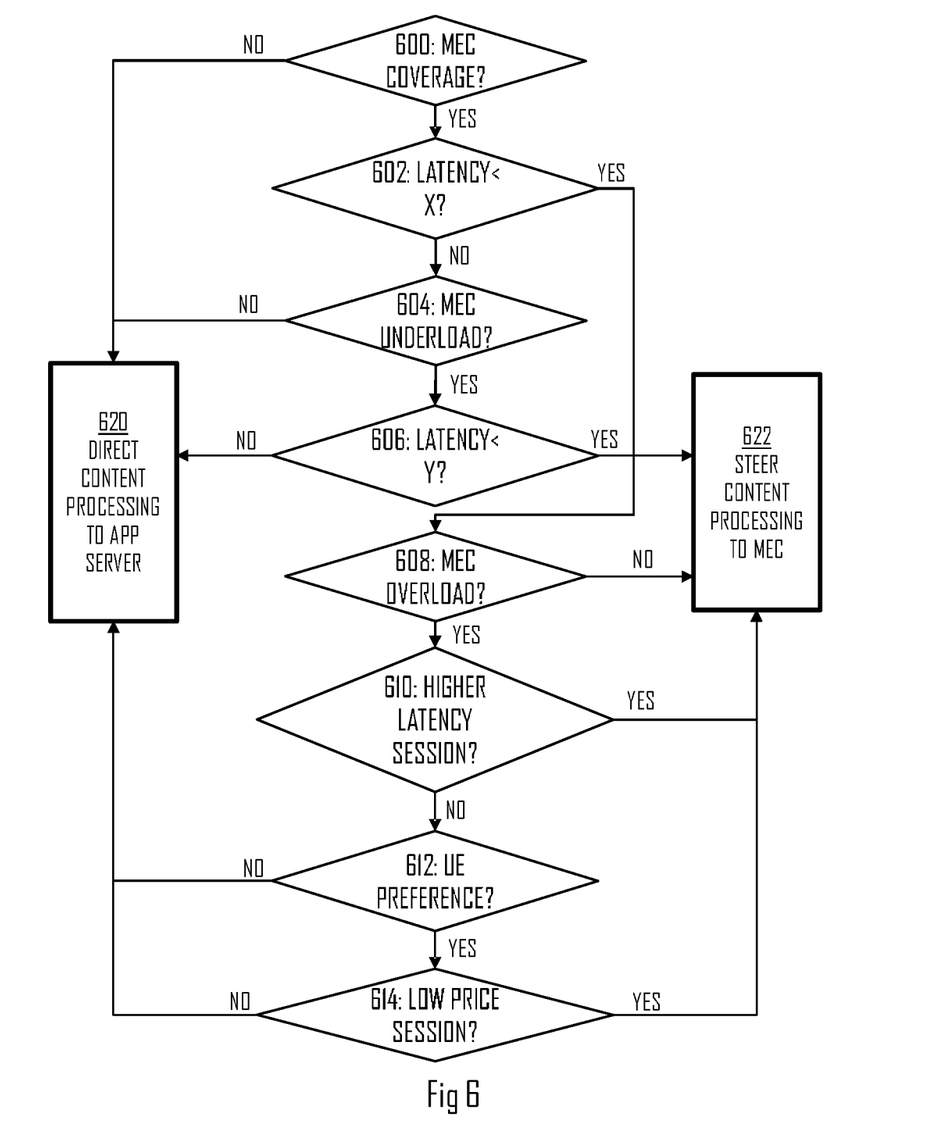
FIG. 6 illustrates an embodiment of a handover policy decision structure.

FIG. 6 illustrates an embodiment of a policy decision procedure for a session, covering several criteria. FIG. 6 also illustrates some priorities between the different criteria. It is obvious that the decision-chain may be adapted to various implementations. Referring to FIG. 6, the PCF may first determine whether or not the terminal device having the session is under the MEC coverage (block 600). If the terminal device is not under the MEC coverage, the content processing is directed to the application server (block 620) in the core network or beyond and the decision process may end a new check for the location and mobility of the terminal device is made. If the terminal device is determined to be within the coverage area of the MEC, the process may proceed to block 602 where latency requirement of the session is compared with the threshold X. If the latency requirement is above the threshold X, meaning that the session tolerance high latency, the process may proceed to block 604 where the processing load of the MEC is checked. If the MEC is not underloaded, i.e. is in efficient use or even overloaded, the process may proceed to block 620 where the session is steered or handed over to the application server. If the MEC is underloaded ('yes' in block 604), the process proceeds to block 606 where the latency requirement is compared with the threshold Y. If the latency requirement is below the threshold Y, the session may be steered to the MEC (block 622). Otherwise, the session may be steered to the application server (block 620).

If the latency requirement is below the threshold X in block 602, the process may proceed to block 608 where the processing load of the MEC is checked. If the processing load of the MEC indicates that the MEC has capacity for the session, the session may be steered to the MEC. If the processing load of the MEC indicates that the MEC has no capacity for the session, e.g. is overloaded, the process may proceed to block 610 where the PCF checks whether or not another session having a higher latency tolerance is currently within the MEC. If such a session is discovered, the PCF may initiate a handover procedure for such another session to steer that other session to the application server. The session under consideration may then utilize the released MEC capacity and be steered to the MEC (block 622). If no session with a higher latency tolerance is discovered in block 610, the process may proceed to block 612 where the preference(s) of the terminal device are determined. If the terminal device or the subscription profile sets no preferences regarding the content processing, the session may be steered to the application server. If the terminal device or the subscription profile sets a preference, e.g. would prefer the MEC, the process may proceed or to block 614. In block 614, the charging rate of the session is determined and the PCF compares the charging rate with a threshold CR. If the charging rate is below the threshold, indicating a low-price session, the session may be steered to the MEC. Otherwise, the session may be steered to the application server.

It should be appreciated that certain blocks of FIG. 6 may be omitted or replaced, as well as their priorities may be modified according to the desired policy structure employed by the PCF. For example, block 614 may be omitted if the charging rate is considered as not important for the handover decision.

Figure 7:
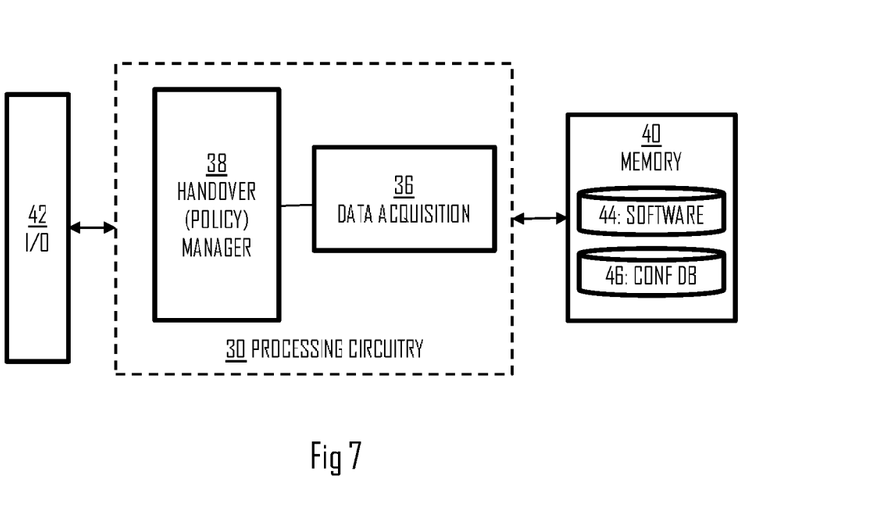
FIG. 7 illustrates a block diagram of an apparatus according to an embodiment.

FIG. 7 illustrates an apparatus comprising at least one processor or a processing circuitry 30, and at least one memory 40 including a computer program code (software) 44, wherein the at least one memory and the computer program code (software) are configured, with the at least one processor, to cause the respective apparatus to carry out any one of the embodiments described above. The apparatus may implement the PCF or the NEF, as described above. The apparatus of FIG. 7 may be an electronic device.

Referring to FIG. 7, the memory 40 may be implemented using any suitable data storage technology, such as semiconductor based memory devices, flash memory, magnetic memory devices and systems, optical memory devices and systems, fixed memory and removable memory. The memory may comprise a configuration database 46 for storing configuration parameters, e.g. the criteria for determining the handover policies for sessions or API configurations for the NEF.

The apparatus may further comprise a communication interface 42 comprising hardware and/or software for realizing communication connectivity according to one or more communication protocols. When the apparatus implements the PCF, the communication interface 42 may provide the apparatus with a communication capability with at least the NEF 202, for example. The communication interface may comply with specifications of the Npcf interface of the 5G specifications. When the apparatus implements the NEF, the communication interface 42 may provide the apparatus with communication capability with the application servers 206, the PCF 200, the SMF 208, and the UDR 204. The communication interface may thus, under the control of the processing circuitry 30, form the necessary API(s) enabling the network elements 200, 204, 208 and the application server(s) 206 to communicate with one another. The communication interface may thus comprise necessary digital and analog components required to implement such communications.

The processing circuitry may comprise a handover manager 38 configured to execute the process of FIG. 3. When the apparatus implements the PCF, the handover manager is a handover policy manager determining the policies for steering sessions between the application processors in the core network or beyond and the MEC. The handover policy manager balances the processing load between the application processors and the MEC by dynamically handing sessions over between them. When the apparatus implements the NEF, the handover manager 38 is triggered by reception of a handover notification for a session from the PCF (step 508). In such a case, the handover manager manages execution of steps 510 and 512, for example.

The processing circuitry 30 may further comprise a data acquisition circuitry 36 configured to acquire the information needed for making the handover decisions. When the apparatus implements the NEF, the data acquisition circuitry 36 may execute steps 500, 502, 504 and 505. When the apparatus implements the PCF, the data acquisition circuitry may execute steps 504 and 505, and/or other respective steps where the PCF acquires the required information such as the location or mobility of the terminal device, preferences of the terminal device, charging rate of the MEC or sessions, etc.

In an embodiment, at least some of the functionalities of the apparatus of FIG. 7 are shared between two physically separate devices, forming one operational entity. Therefore, the apparatus may be seen to depict the operational entity comprising one or more physically separate devices for executing at least some of the processes described with respect to the PCF and/or NEF. The apparatus may generate a virtual network combining hardware and software network resources and network functionality into a single, software-based administrative entity, a virtual network. The virtual network may employ physical resources of the core network, radio access network, application server(s), and/or even the terminal device(s). In other words, some or all handover policy computation may be outsourced even to the terminal device(s), if such is considered feasible from the perspective of implementation. In such a case, the apparatus of FIG. 7 may be the terminal device, and the communication interface 42 may comprise a radio modem and a radio frequency circuitry and an antenna for communication with one or more access nodes of the radio access network of the mobile communication network. Network virtualization may involve platform virtualization, often combined with resource virtualization. Network virtualization may be categorized as external virtual networking which combines many networks, or parts of networks, into a server computer or a host computer. External network virtualization is targeted to optimized network sharing. Another category is internal virtual networking which provides network-like functionality to the software containers on a single system.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 6 may be carried out by an apparatus comprising means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus, comprising:
   at least one processor; and
   at least one memory including computer program code, wherein the at least one memory and the computer program code are configured, with the at least one processor, to cause the apparatus to:
   receive, when establishing a session during initial policy negotiation, a policy creation request from a session management function;
   determine to handover content processing of application data of a terminal device from a first network element to a second network element, wherein one of the first network element and the second network element is configured to perform multi-access edge computing and the other one of the first network element and the second network element is an application server in a core network or beyond the core network from a perspective of a network element configured to perform the multi-access edge computing, wherein the handover determination is based at least in part on comparing a latency requirement of the session and a threshold; and
   transmit to a network exposure function at least one handover message to cause the handover of the content processing of the application data from the first network element to the second network element, wherein the at least one handover message comprises a handover message directed to the application server comprising a transaction identifier mapping a multi-access edge computing load request with a multi-access edge computing load request response and load information indicating the current load associated with content processing of the application.

2. The apparatus of claim 1, wherein the content processing of the application data comprises application layer analysis of the application data or application layer transformation of the application data.

3. The apparatus of claim 1, wherein the at least one memory and the computer program code are further configured, with the at least one processor, to cause the apparatus to determine the handover on the basis of at least one of the following handover criteria: processing load in the multi-access edge computing, latency requirement of the application data, location or mobility of the terminal device, preference of the terminal device, and preference of the application server.

4. The apparatus of claim 1, wherein the at least one handover message further comprises a handover command directed to the session management function controlling user plane traffic routing of the terminal device.

5. The apparatus of claim 4, wherein the handover message directed to the application server further comprises an application identifier of an application associated with the application data and an identifier indicating the terminal device.

6. The apparatus of claim 5, wherein the at least one memory and the computer program code are further configured, with the at least one processor, to cause the apparatus to receive, in response to the handover message directed to the application server, a traffic steering configuration, and to transmit the traffic steering configuration to the session management function in the handover command.

7. The apparatus of claim 4, wherein the at least one handover message further comprises a handover message directed to the network element of the multi-access edge computing, and wherein the at least one memory and the computer program code are further configured, with the at least one processor, to cause the apparatus to receive, in response to the handover message directed to the network element of the multi-access edge computing, application context information, and to transmit the application context information to the session management function in the handover command.

8. The apparatus of claim 1, wherein the at least one memory and the computer program code are further configured, with the at least one processor, to cause the apparatus to implement a policy control function in a mobile communication network comprising the terminal device, the first network element, and the second network element, and to transmit the handover message to a network exposure function of the mobile communication network.

9. The apparatus of claim 1, wherein the at least one memory and the computer program code are further configured, with the at least one processor, to cause the apparatus to implement a network exposure function of a mobile communication network and to provide an application programming interface between a policy control function of the mobile communication network and each of the first network element and the second network element, to perform said determining based upon a handover message received from the policy control function.

10. The apparatus of claim 9, wherein the at least one memory and the computer program code are further configured, with the at least one processor, to cause the apparatus to transmit a processing load query request to the network element of the multi-access edge computing and to receive, in response to the processing load query request, a processing load response from the network element of the multi-access edge computing, the processing load response indicating processing load of the network element of the multi-access edge computing.

11. The apparatus of claim 1, wherein the apparatus comprises the terminal device.

12. The apparatus of claim 1, wherein the at least one handover message steers, from the first network element to the second network element, application layer content processing tasks of a session of the terminal device.

13. A method, comprising:
   receiving, by a network element of a mobile communication network, when establishing a session during initial policy negotiation, a policy creation request from a session management function;
   determining, by the network element of the mobile communication network, to handover content processing of application data of a terminal device from a first network element to a second network element, wherein one of the first network element and the second network element is configured to perform multi-access edge computing and the other one of the first network element and the second network element is an application server in a core network or beyond the core network from a perspective of a network element configured to perform the multi-access edge computing, wherein the handover determination is based at least in part on comparing a latency requirement of the session and a threshold; and transmitting, by the network element to a network exposure function, at least one handover message to handover the content processing of the application data from the first network element to the second network element, wherein the at least one handover message comprises a handover message directed to the application server comprising a transaction identifier mapping a multi-access edge computing load request with a multi-access edge computing load request response and load information indicating the current load associated with content processing of the application.

14. The method of claim 13, wherein the method is carried out by a policy control function of the mobile communication network, and wherein the handover message is transmitted to a network exposure function of the mobile communication network.

15. The method of claim 13, wherein the method is carried out by a network exposure function of the mobile communication network, the network exposure function providing an application programming interface between a policy control function of the mobile communication network and each of the first network element and the second network element, and wherein the network exposure function performs said determining on the basis of a handover message received from the policy control function.

16. A non-transitory computer-readable medium comprising program instructions stored thereon for performing a process comprising:

receiving, when establishing a session during initial policy negotiation, a policy creation request from a session management function;

determining to handover content processing of application data of a terminal device from a first network element to a second network element, wherein one of the first network element and the second network element is configured to perform multi-access edge computing and the other one of the first network element and the second network element is an application server in a core network or beyond the core network from a perspective of a network element configured to perform the multi-access edge computing, wherein the handover determination is based at least in part on comparing a latency requirement of the session and a threshold; and transmitting to a network exposure function at least one handover message to handover the content processing of the application data from the first network element to the second network element, wherein the at least one handover message comprises a handover message directed to the application server comprising a transaction identifier mapping a multi-access edge computing load request with a multi-access edge computing load request response and load information indicating the current load associated with content processing of the application.

* * * * *